US012736451B2

(12) United States Patent
Brengartner et al.

(10) Patent No.: US 12,736,451 B2
(45) Date of Patent: Sep. 15, 2026

(54) VIBRONIC MULTISENSOR

(71) Applicant: Endress+Hauser SE+Co. KG, Maulburg (DE)

(72) Inventors: Tobias Brengartner, Emmendingen (DE); Sergey Lopatin, Lörrach (DE); Jan Schleiferböck, Rümmingen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 321 days.

(21) Appl. No.: 18/686,474

(22) PCT Filed: Jul. 22, 2022

(86) PCT No.: PCT/EP2022/070623
§ 371 (c)(1),
(2) Date: Feb. 26, 2024

(87) PCT Pub. No.: WO2023/030754
PCT Pub. Date: Mar. 9, 2023

(65) Prior Publication Data

US 2024/0377302 A1 Nov. 14, 2024

(30) Foreign Application Priority Data

Aug. 31, 2021 (DE) ..................... 10 2021 122 533.7

(51) Int. Cl.
*G01N 9/00* (2006.01)
*G01F 1/66* (2022.01)
(Continued)

(52) U.S. Cl.
CPC ............. *G01N 9/002* (2013.01); *G01N 11/16* (2013.01); *G01F 1/66* (2013.01); *G01F 23/296* (2013.01);
(Continued)

(58) Field of Classification Search
CPC .................. G01N 9/002; G01N 11/16; G01N 2009/006; G01F 23/2967; G01F 23/2968; G01F 1/66; G01F 23/296
See application file for complete search history.

(56) References Cited

U.S. PATENT DOCUMENTS 4,922,745 A 5/1990 Rudkin et al.
5,836,192 A * 11/1998 Getman .............. G01F 23/2965 367/908

FOREIGN PATENT DOCUMENTS

DE 102007058608 A1 6/2009
DE 102012100728 A1 8/2013
(Continued)

*Primary Examiner* — Jonathan M Dunlap
(74) *Attorney, Agent, or Firm* — Gil M. Repa; Endress+Hauser (USA) Holding, Inc.

(57) ABSTRACT

An apparatus for determining and/or monitoring a process variable of a medium comprises a sensor unit having a mechanically oscillatable unit and a first piezoelectric element, wherein the piezoelectric element is in an internal volume of the oscillatable unit, wherein the apparatus is embodied to excite the mechanically oscillatable unit using an excitation signal such that mechanical oscillations are executed, to receive the mechanical oscillations of the oscillatable unit and to convert them into a first received signal, and, based on the first received signal, to determine and/or to monitor the at least one process variable. A coupling element is arranged in the internal volume in such a manner that the coupling element is in mechanical contact with the piezoelectric element.

8 Claims, 5 Drawing Sheets

(51) Int. Cl.
*G01F 23/296* (2022.01)
*G01N 11/16* (2006.01)

(52) U.S. Cl.
CPC ...... *G01F 23/2967* (2013.01); *G01F 23/2968* (2013.01); *G01N 2009/006* (2013.01)

(56) References Cited

FOREIGN PATENT DOCUMENTS

| | | | |
|---|---|---|---|
| DE | 102019116150 | A1 | 12/2020 |
| EP | 0769682 | A2 | 4/1997 |
| EP | 0903563 | A1 | 3/1999 |
| EP | 0903563 | B1 | 11/2006 |

* cited by examiner

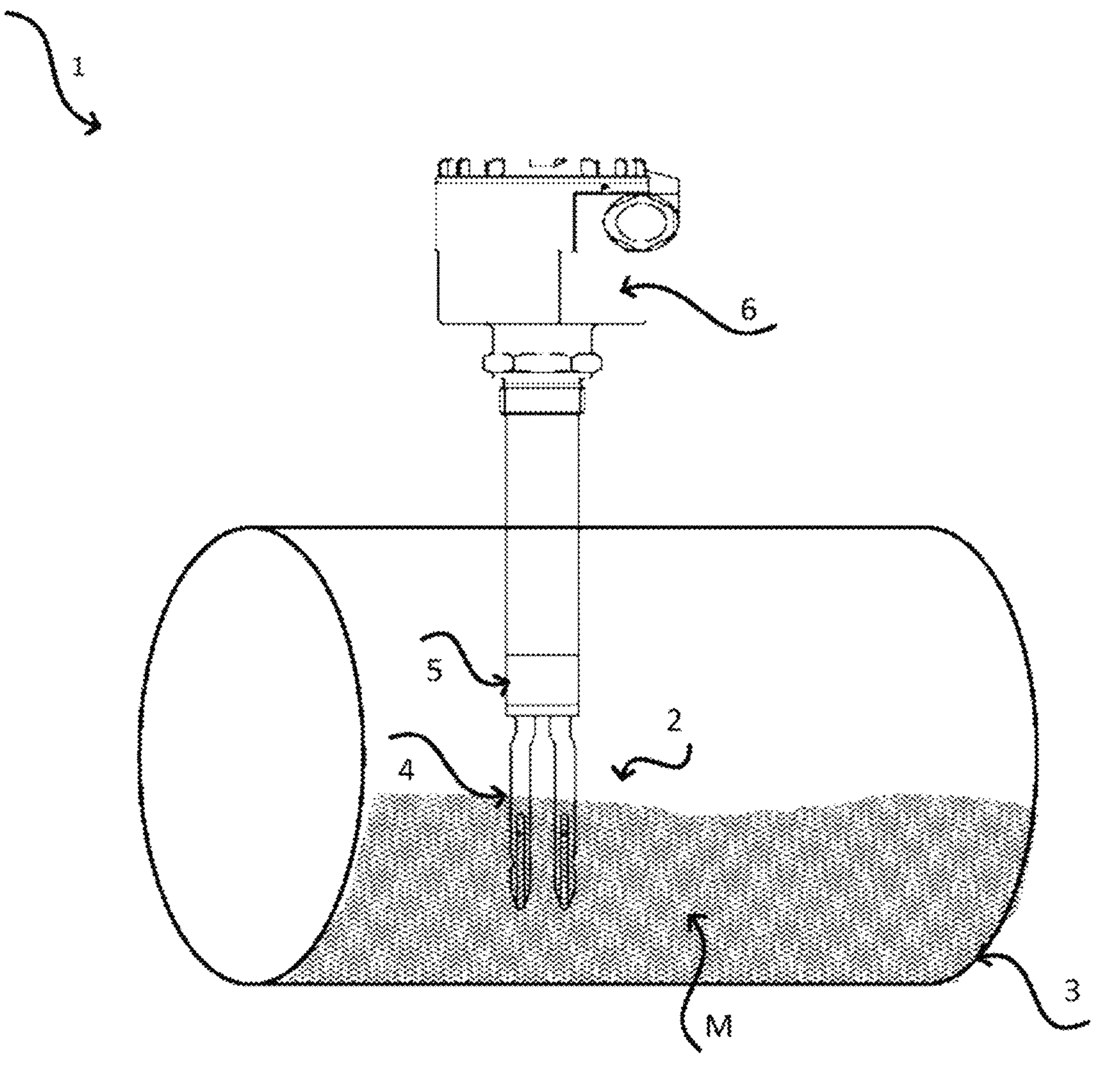
Fig. 1
Prior Art

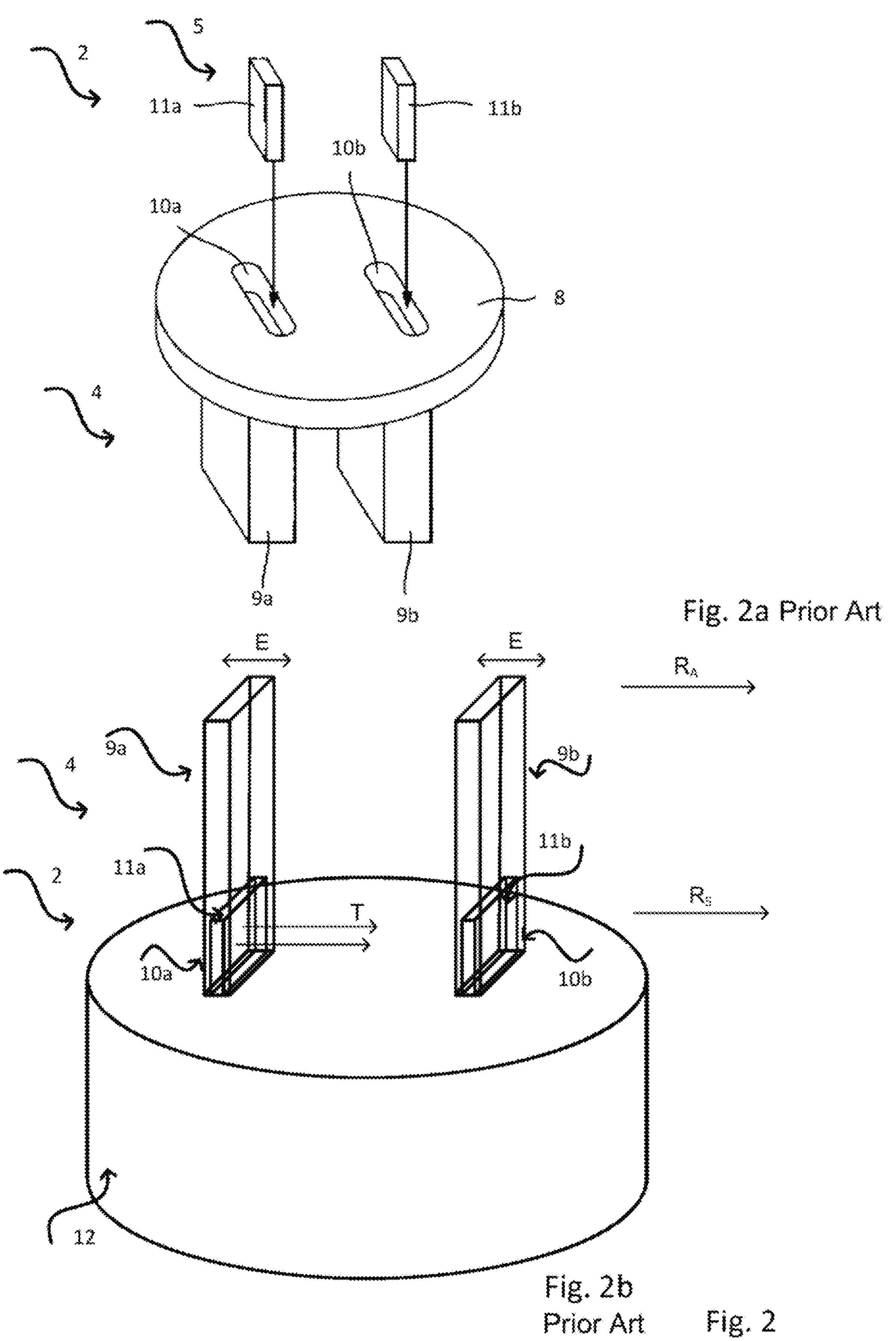
Fig. 2a Prior Art
Fig. 2b Prior Art
Fig. 2

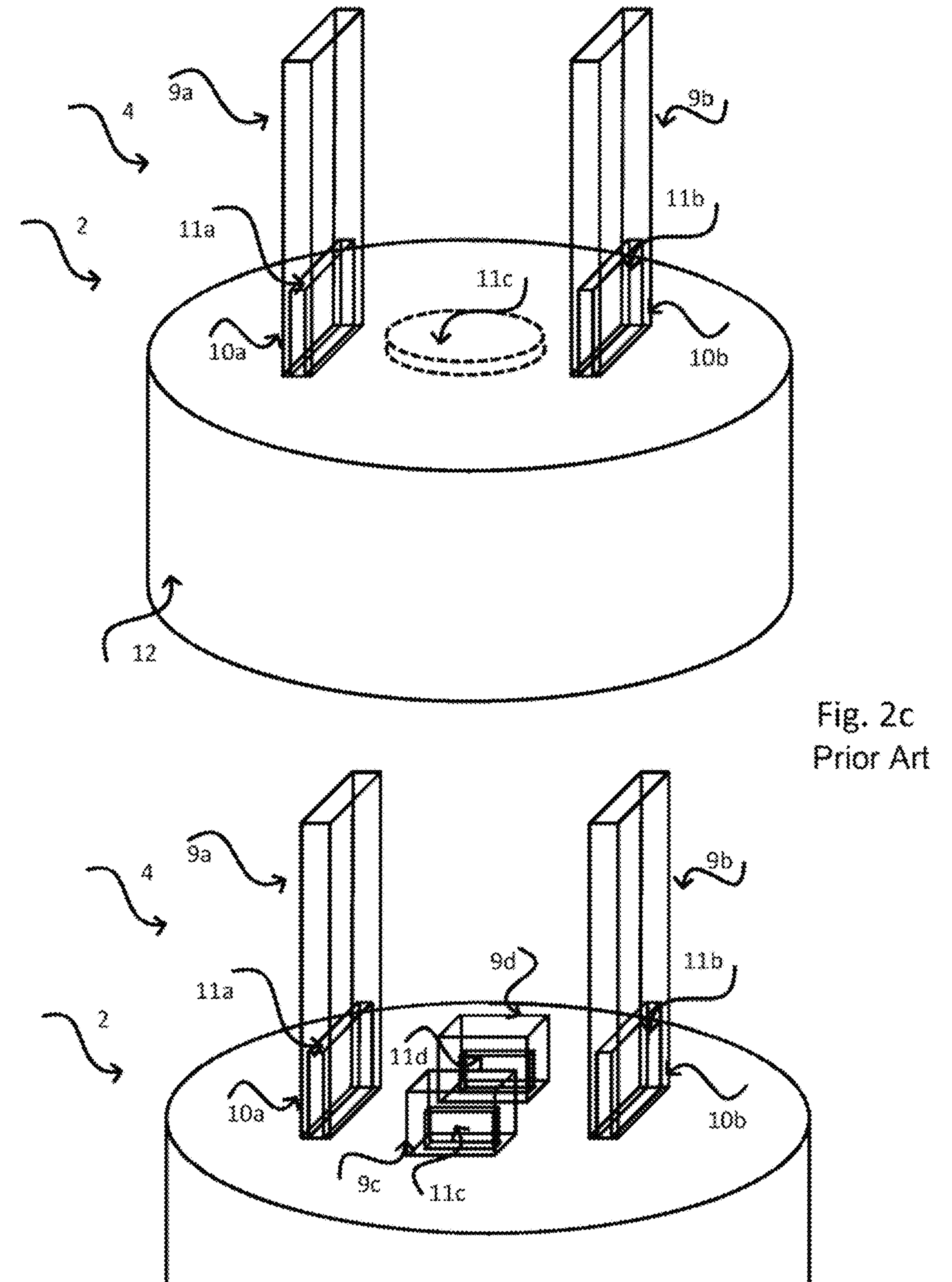
Fig. 2c
Prior Art
Fig. 2d
Prior Art
Fig. 2

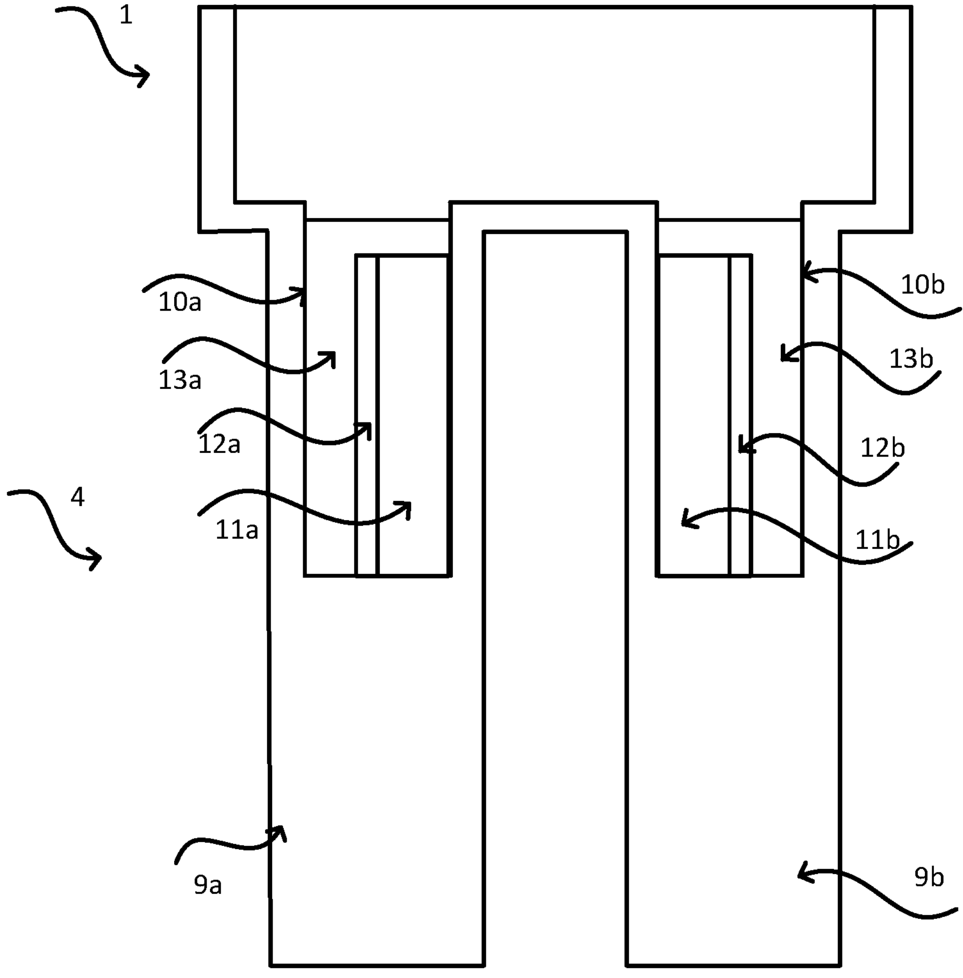
Fig. 3

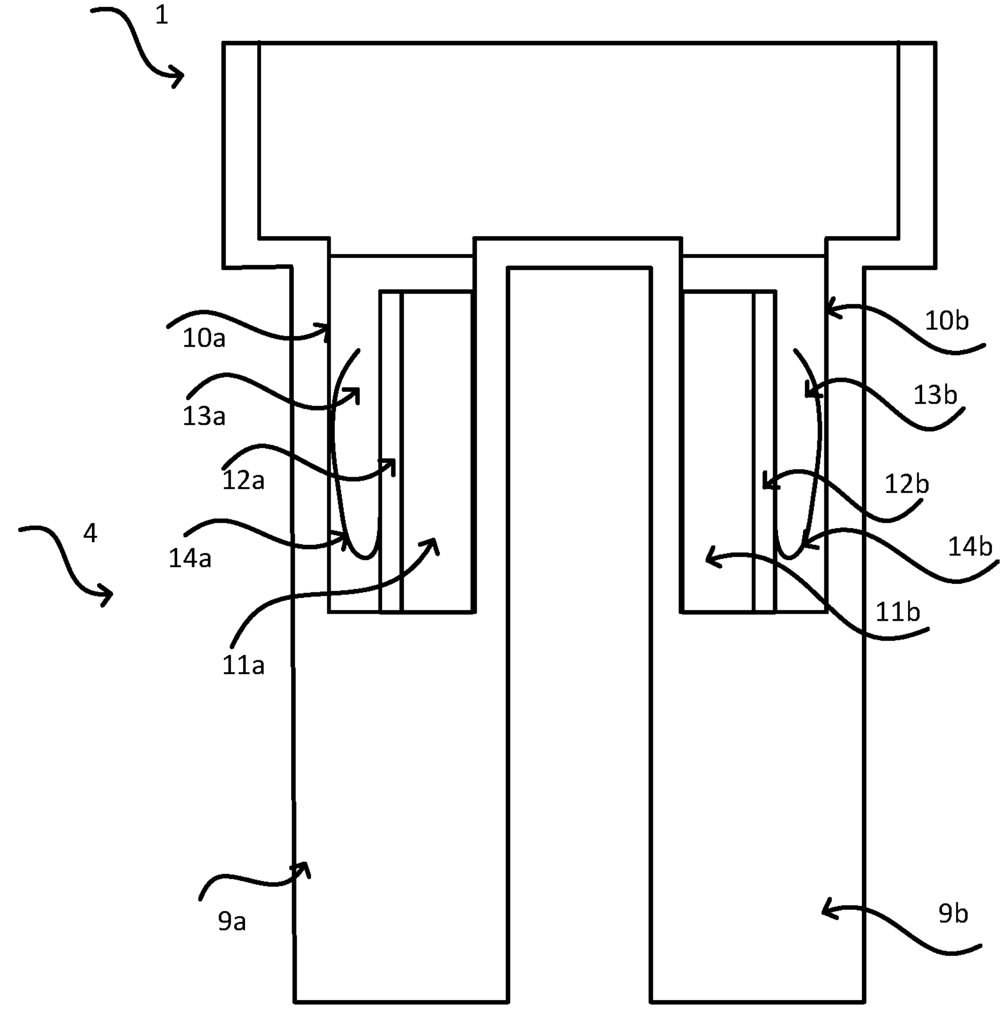
Fig. 4

VIBRONIC MULTISENSOR

CROSS-REFERENCE TO RELATED APPLICATIONS

The present application is related to and claims the priority benefit of DPMA Patent Application No. 10 2021 122 533.7, filed on Aug. 31, 2021, and International Patent Application No. PCT/EP2022/070623, filed Jul. 22, 2022, the entire contents of which are incorporated herein by reference.

TECHNICAL FIELD

The invention relates to an apparatus for determining and/or monitoring at least one process variable of a medium, comprising a sensor unit having a mechanically oscillatable unit and at least one piezoelectric element, wherein the piezoelectric element is arranged, at least partially, in an internal volume of the oscillatable unit. The medium is located in a containment, for example, in a container or in a pipeline.

BACKGROUND

Vibronic sensors are widely used in process and/or automation technology. In the case of fill level measuring devices, such have at least one mechanically oscillatable unit, such as, for example, an oscillatory fork, a single tine or a diaphragm. Such is excited during operation by means of an exciting/receiving unit, frequently in the form of an electromechanical transducer unit, such that mechanical oscillations are executed. The electromechanical transducer unit can be, for example, a piezoelectric drive or an electromagnetic drive. Corresponding field devices are manufactured by the applicant in great variety and sold, for example, under the LIQUIPHANT or SOLIPHANT marks. The underpinning measuring principles are known, in principle, from a large number of publications. The exciting/receiving unit excites the mechanically oscillatable unit by means of an electrical excitation signal, such that mechanical oscillations are executed. Conversely, the exciting/receiving unit can receive the mechanical oscillations of the mechanically oscillatable unit and convert such into an electrical, received signal. The exciting/receiving unit is either separate exciting and receiving units, or one combined exciting/receiving unit.

In such case, the exciting/receiving unit is in many cases part of a fed back, electrical, oscillatory circuit, by means of which the exciting of the mechanically oscillatable unit occurs, such that mechanical oscillations are executed. For example, for a resonant oscillation, the oscillatory circuit state must be created, in which the amplification factor is ≥1 and all phases arising in the oscillatory circuit sum to a multiple of 360°. For exciting and fulfilling the oscillatory circuit state, a certain phase shift between the excitation signal and the received signal needs to be assured. Therefore, frequently a predeterminable value for the phase shift, thus, a desired value for the phase shift between the excitation signal and the received signal, is set. For this, the state of the art offers the most varied of solutions, including both analog as well as also digital methods, such as described, for example, in DE102006034105A1, DE102007013557A1, DE102005015547A1, DE102009026685A1, DE102009028022A1, DE102010030982A1 and DE00102010030982A1.

Both the excitation signal as well as also the received signal are characterized by a frequency ω, an amplitude A and/or a phase Φ. Correspondingly, changes in these variables are usually taken into consideration for determining the particular process variable. The process variable can be, for example, a fill level, a predetermined fill level, or the density or viscosity of the medium, as well as flow, e.g. flow rate. In the case of a vibronic limit level switch for liquids, for example, it is distinguished, whether the oscillatable unit is covered by the liquid or freely oscillating. These two states, the free state and the covered state, are distinguished, in such case, for example, based on different resonance frequencies, thus, based on a frequency shift.

The density and/or viscosity, in turn, can only be ascertained with such a measuring device, when the oscillatable unit is completely covered by the medium. For determining density and/or viscosity, likewise different options are provided by the state of the art, such as those described, for example, in DE10050299A1, DE102007043811A1, DE10057974A1, DE102006033819A1, DE102015102834A1 and DE102016112743A1.

Known from DE102012100728A1 and DE102017130527A1 are various vibronic sensors, in the case of which the piezoelectric elements are arranged, at least partially, within the oscillatable unit. With such and similar arrangements, advantageously a plurality of process variables can be determined with a single sensor and used for characterizing different processes, such as described, for example, in WO2020/094266A1, DE102019116150A1, DE102019116151A1, DE02019116152A1, DE102019110821A1, DE102020105214A1 and DE102020116278A1.

In vibronic sensors, the oscillation frequency of the oscillatable unit depends mainly on the geometry and arrangement of the oscillatory elements. If at least one piezoelectric element is arranged in an internal volume of the oscillatable unit, the special arrangement can significantly influence the mechanical oscillation characteristics of the oscillatable unit. For example, the piezoelectric element can be potted in the oscillatable unit or adhered in an internal volume of the oscillatable unit. In such case, aging effects in the potting compound or adhesive, for example, can lead to changes of the oscillatory behavior, especially to a drift in values ascertained for the process variable of interest, such as, for example, a fill level, or a media property, such as density or viscosity.

SUMMARY

Therefore, an object of the invention is to provide a vibronic sensor exhibiting long term stability as regards its mechanical oscillatory behavior.

The object is achieved by an apparatus for determining and/or monitoring at least one process variable of a medium, comprising a sensor unit having a mechanically oscillatable unit, and at least a first piezoelectric element, wherein the piezoelectric element is arranged, at least partially, in an internal volume of the oscillatable unit, wherein the apparatus is embodied to excite the mechanically oscillatable unit by means of an excitation signal, such that mechanical oscillations are executed, to receive the mechanical oscillations of the oscillatable unit and to convert them into a first received signal, and, based on the first received signal, to determine and/or to monitor the at least one process variable. According to the invention, a coupling element is arranged in the internal volume in such a manner that the coupling element is in mechanical contact with the piezoelectric element.

The mechanically oscillatable unit is, for example, a diaphragm, a single tine, an arrangement of at least two oscillatory elements, or an oscillatory fork. The piezoelectric element is arranged together with the coupling element in the internal volume of the oscillatable unit. In such case, the coupling element serves for a mechanical decoupling of the piezoelectric element, especially a unilateral decoupling of the piezoelectric element.

By means of the excitation signal, mechanical oscillations of the oscillatable unit are produced and these are influenced by the properties of the medium when the oscillatable unit is covered by the medium. Correspondingly, based on the first received signal, which represents the oscillations of the oscillatable unit, information concerning the at least one process variable can be ascertained. The excitation signal is, for example, an electrical signal having at least one predeterminable frequency, especially a sinusoidal or rectangular signal. Preferably, the mechanically oscillatable unit is at least at times excited to execute resonant oscillations. The apparatus can, furthermore, comprise an electronics, for example, for signal registration and/or -feeding.

In an embodiment, the apparatus is embodied to transmit a transmitted signal and to receive a second received signal, and to determine and/or to monitor the at least one process variable based on the first and/or second received signal. In such case, the piezoelectric element serves, on the one hand, as exciting/receiving unit for producing the mechanical oscillations of the mechanically oscillatable unit and, on the other hand, for transmitting the transmitted signal, which is received in the form of the second received signal. The transmitted signal is preferably an ultrasonic signal, especially a pulsed, ultrasonic signal, especially at least one ultrasonic pulse. As second applied measuring method in the context of the invention, accordingly, an ultrasonically based measuring is performed.

When the transmitted signal on its path at least at times and sectionally passes through the medium, it is likewise influenced by the physical and/or chemical properties of the medium and can correspondingly be taken into consideration for determining a process variable of the medium. Thus, when both an excitation signal and a transmitted signal are produced, at least two measuring principles can be implemented in a single apparatus and at least two different process variables evaluated. The two received signals can, in such case, advantageously be evaluated independently of one another. Thus, according to the invention, the number of ascertainable process variables can be significantly increased, this resulting in a higher functionality of a sensor, and an expanded application range. In connection with the additional production of a transmitted signal, furthermore, reference is made to WO2020/094266A1, to which comprehensive reference is taken in the context of the present invention.

In an advantageous embodiment, the sensor unit comprises at least first and second piezoelectric elements. However, also more than two piezoelectric elements can be present, which can be arranged at different positions relative to the oscillatable unit.

In an additional advantageous embodiment, the mechanically oscillatable unit is an oscillatory fork having first and second oscillatory elements, wherein the first piezoelectric element is arranged, at least partially, in the first oscillatory element and, when the sensor unit includes a second piezoelectric element, the second piezoelectric element is arranged, at least partially, in the second oscillatory element. Corresponding embodiments of a sensor unit are described, for example, in DE102012100728A1 and DE102017130527A1. Comprehensive reference is taken to the two applications in the context of the present invention. The embodiments of the sensor described in the two documents represent, by way of example, possible structural embodiments of the sensor unit. It is, for example, not absolutely necessary that the piezoelectric elements be arranged exclusively in the region of the oscillatory elements. Rather, individuals of the applied piezoelectric elements can also be arranged in the region of the diaphragm or in other oscillatory elements not used for the vibronic excitation but still mounted on the diaphragm.

In yet another embodiment, the sensor unit comprises a unit for determining and/or monitoring temperature of the medium, a unit for determining and/or monitoring a pressure of the medium and/or a unit for determining and/or monitoring a conductivity and/or permittivity of the medium. Of interest in this connection are the documents DE102019116150A1, DE102019116151A1 and DE02019116152A1, to which reference is likewise taken in the context of the invention.

In an embodiment of the apparatus of the invention, at least one hollow space is present in the oscillatable unit and forms the internal volume, wherein the piezoelectric element and the coupling element are in the hollow space.

Advantageously, the hollow space is filled with a filling, especially with a potting compound, for example, an adhesive. In this way, a force interlocking connection between the piezoelectric element and the oscillatable unit can be achieved. The coupling element is then advantageously arranged relative to the piezoelectric element in such a manner that it decouples the piezoelectric element from the filling. In this way, negative effects on the oscillatory behavior of the oscillatable unit due to an aging of the filling can be advantageously prevented, or reduced.

It is, additionally, advantageous that the piezoelectric element is arranged in such a manner in the hollow space that the piezoelectric element lies against a wall of the hollow space, wherein the piezoelectric element is arranged between the wall and the coupling element.

In an advantageous embodiment of the invention, the coupling element is composed, at least partially, of a compressible, especially porous, material, especially a material having a Poisson ratio of <0.3. The pores of the porous material can, for example, compensate expansion effects of a filling as a function of temperature.

In this connection, it is, in turn, advantageous that the compressible material is a foam material, especially based on polypropylene, silicone rubber, polymethylmethacrylate, polyurethane or polyamide, a porous paper or a foamed adhesive.

Depending on choice of material for the coupling element, also an acoustic decoupling of the piezoelectric element can be achieved, this in turn being especially advantageous, when, besides the excitation signal, also the transmitted signal is produced. An acoustic decoupling is especially possible in the case of use of a foamed substance for the coupling element.

It is, additionally, advantageous when the coupling element is embodied in the form of a thin film, or in the form of a coating, especially a lacquer coating. Such an embodiment is especially easily implementable in the manufacturing.

In an additional preferred embodiment of the apparatus, the coupling element includes securement means for securing the coupling element in the internal volume.

Advantageously, the securement means is a volumed body or a clamp body, especially a spring element.

BRIEF DESCRIPTION OF THE DRAWINGS

The present disclosure will now be explained in greater detail based on the appended drawing, the figures of which show as follows:

FIG. 1 shows a schematic view of a vibronic sensor according to the state of the art, FIG. 2 shows different possible embodiments for vibronic sensors according to the state of the art, in the case of which piezoelectric elements are arranged within the oscillatory elements, FIG. 3 shows a first preferred embodiment of an apparatus of the present disclosure, and FIG. 4 shows a second preferred embodiment of an apparatus of the present disclosure.

In the figures, equal elements are provided with equal reference characters.

DETAILED DESCRIPTION

FIG. 1 shows a vibronic sensor 1 with a sensor unit 2. The sensor includes a mechanically oscillatable unit 4 in the form of an oscillatory fork, which is partially immersed in a medium M located in a container 3. Oscillatable unit 4 is excited by means of the exciting/receiving unit 5, such that the oscillatable unit executes mechanical oscillations. For example, a piezoelectric stack- or bimorph drive can be used. Other vibronic sensors operate, for example, via electromagnetic exciting/receiving units 5. It is possible to use a single exciting/receiving unit 5, which serves for exciting the mechanical oscillations as well as for their detection. Likewise, however, it is also known to implement separate driving and receiving units. FIG. 1 includes, furthermore, an electronics 6, by means of which signal registration,—evaluation and/or—feeding occurs.

FIG. 2 shows, by way of example, an assortment of sensor units 2 of vibronic sensors 1, in the case of which the piezoelectric elements 5 are arranged in an internal volume of the oscillatable unit. The mechanically oscillatable unit 4 shown in FIG. 2*a* comprises, mounted on a base 8, two oscillatory elements 9*a*,9*b*, which are also referred to as the tines of a fork. Optionally, paddles (not shown) can be formed on the ends of the two oscillatory elements 9*a*,9*b*. Introduced into each of the two oscillatory elements 9*a*,9*b* are, especially, pocket-like, hollow spaces 10*a*, 10*b*, in which, in each case, at least one piezoelectric element 11*a*, 11*b* of the exciting/receiving unit 5 is arranged. Preferably, the piezoelectric elements 11*a* and 11*b* are potted within the hollow spaces 10*a* and 10*b*. The hollow spaces 10*a*, 10*b* can, in such case, be so formed that the two piezoelectric elements 11*a*, 11*b* are located completely or partially in the region of the two oscillatory elements 9*a*, 9*b*. Such an arrangement as well as other similar arrangements are described at length in DE102012100728A1.

Another example of a possible embodiment of a sensor unit 2 is shown in FIG. 2*b*. The mechanically oscillatable unit 4 has two mutually parallel, here bar-shaped, oscillatory elements 9*a*, 9*b* mounted on a disc shaped element 12. The oscillatory elements 9*a*, 9*b* are excitable to execute mechanical oscillations separately from one another and their oscillations can likewise be received and evaluated separately from one another. Each of the oscillatory elements 9*a* and 9*b* has a hollow space 10*a* and 10*b*, in which is arranged in the region facing the disc shaped element 12, in each case, at least one piezoelectric element 11*a* and 11*b*. Regarding the embodiment of FIG. 2*b*, reference is made to German patent application No. DE102017130527A1 unpublished as of the earliest filing date of this application.

As shown schematically in FIG. 2*b*, the sensor unit 2 is, on the one hand, supplied with an excitation signal E, in such a manner that the oscillatable unit 4 is excited to execute mechanical oscillations. The oscillations are produced, in such case, by means of the two piezoelectric elements 11*a* and 11*b*. The two piezoelectric elements can be supplied with the same excitation signal E, but also a supplying of the first oscillatory element 11*a* with a first excitation signal $E_1$ and the second oscillatory element 11*b* with a second excitation signal $E_2$ is possible. Likewise, a first received signal $R_E$ can be received based on the mechanical oscillations, or separate received signals $R_{E1}$, $R_{E2}$ can be received, one from oscillatory element 9*a* and one from oscillatory element 9*b*.

Moreover, additionally, for example, emanating from the first piezoelectric element 11*a*, a transmitted signal T can be transmitted, which is received by the second piezoelectric element 11*b* in the form of a second received signal $R_T$. Since the two piezoelectric elements 11*a* and 11*b* are arranged at least in the region of the oscillatory elements 9*a* and 9*b*, the transmitted signal T passes through the medium M and is correspondingly influenced by the properties of the medium M, when the sensor unit 2 is in contact with the medium M. Preferably, the transmitted signal T is an ultrasonic signal, especially a pulsed, ultrasonic signal, especially at least one ultrasonic pulse. Likewise, it is, however, an option that the transmitted signal T is transmitted from the first piezoelectric element 11*a* in the region of the first oscillatory element 9*a* and is reflected on the second oscillatory element 9*b*. In such case, the second received signal $R_T$ is received by the first piezoelectric element 11*a*. The transmitted signal T, in such case, passes through the medium M two times, this leading to a doubling of a travel time T of the transmitted signal T.

Besides these two illustrated embodiments of an apparatus 1 of the invention, numerous other variants are possible, which likewise fall within the scope of the invention. For example, it is possible for the embodiments of FIGS. 2*a* and 2*b* to use only one piezoelectric element 11*a*, 11*b* and to arrange it in at least one of the two oscillatory elements 9*a*, 9*b*. In such case, piezoelectric element 11*a* serves for producing the excitation signal, and the transmitted signal T, as well as for receiving the first received signal $R_1$ and the second received signal $R_2$. Then, the transmitted signal T is transmitted from the first piezoelectric element 11*a* in the region of the first oscillatory element 9*a* and reflected on the second oscillatory element 9*b*, so that also the second received signal $R_T$ is received by the first piezoelectric element 11*a*. The transmitted signal T passes, in such case, through the medium M two times, this resulting in a doubling of a travel time T of the transmitted signal T.

Another possibility is shown, by way of example, in FIG. 2*c*. In this case, a third piezoelectric element 11*c* is provided in the region of the diaphragm 12. The third piezoelectric element 11*c* serves for producing the excitation signal E and for receiving the first received signal $R_1$; the first piezoelectric element 11*a* and second piezoelectric element 11*b* serve for producing the transmitted signal T, and for receiving the second received signal $R_2$. Alternatively, it is, for example, possible to produce the excitation signal E and the transmitted signal T as well as to receive the second received signal $R_2$ all with the first piezoelectric element 11*a* and/or second piezoelectric element 11*b*, wherein the third piezoelectric element 11*c* serves for receiving the first received signal $R_1$. Likewise it is possible to produce the transmitted signal T with the first 11*a* and/or second piezoelectric element 11*b* and the excitation signal E with the third piezoelectric element 11*c* and to receive the first received signal $R_1$ and/or second received signal $R_2$ with the first 11*a* and/or second piezoelectric element 11*b*. Also in the case of FIG. 2*c*, it is for other embodiments possible to omit the first piezoelectric element 11*a* or the second piezoelectric element 11*b*.

Another possible embodiment of the apparatus 1 is shown in FIG. 2*d*. The apparatus includes, starting from the embodiment of FIG. 2*b*, a third oscillatory element 9*c* and a fourth oscillatory element 9*d*. These do not, however, serve for oscillation production. Rather, a third piezoelectric element 11*c* and fourth piezoelectric element 11*d* are arranged respectively in the additional elements 9*c*, 9*d*. In such case, the vibronic measuring is performed by means of the first two piezoelectric elements 11*a*, 11*b* and the ultrasonic measuring by means of the other two piezoelectric elements 11*c*, 11*d*. Also in such case, for each measuring principle, one piezoelectric element, e.g. 11*b* and 11*d*, can be omitted. For reasons of symmetry, it is, however, advantageous, always to use two additional oscillatory elements 9*c*, 9*d*.

A first embodiment of an apparatus 1 of the invention is shown in FIG. 3. Oscillatable unit 4 with the two oscillatory elements 9*a*, 9*b* includes two hollow spaces 10*a*, 10*b*, each of which forms an internal volume, in which, in each case, a piezoelectric element 11*a*, 11*b* is placed. Each of the piezoelectric elements 11*a*, 11*b* is arranged in such a manner in its hollow space that its active surface bears against a wall of its hollow space. Additionally, each hollow space 10*a*, 10*b* has a coupling element 12*a*, 12*b*, wherein each piezoelectric element 11*a*, 11*b* is arranged between the wall that it contacts and the coupling element 12*a*, 12*b* in its hollow space. The coupling elements 12*a* and 12*b* lie accordingly against the non-active surfaces of the piezoelectric elements 11*a*, 11*b*.

The coupling elements 12*a*, 12*b* can be embodied, for example, in the form of a thin film, or in the form of a coating, which can be applied on the piezoelectric element 11*a*, 11*b*. Furthermore, each of the two hollow spaces 10*a*, 10*b* is provided with a filling 13*a*, 13*b*, which can be an adhesive, for example. The fillings 13*a*, 13*b*, on the one hand, facilitate the manufacture of the sensor unit 2. However, they can also protect the piezoelectric elements 11*a*, 11*b* and the, in given cases present, electrical connections (not shown) of the piezoelectric elements 11*a*, 11*b* from influences of an environment of the sensor unit 2, for example, against incursion of condensed moisture, as well as against oxidation, corrosion or fouling.

Advantageously, a separate coupling element 12 is provided for each piezoelectric element 11 arranged in a hollow space 10. In the case in which only one piezoelectric element 11 is used, correspondingly also a single coupling element 12 is sufficient.

A second preferred embodiment of an apparatus 1 of the invention is shown in FIG. 4. The apparatus 1 is embodied largely analogously to the variant of FIG. 3. Additionally, the two coupling elements 12*a* and 12*b* comprise, in each case, a securement means 14*a*, 14*b*. Each securement means is embodied in the form of a clamp body, e.g. in the form of a spring element. The securement means 14*a*, 14*b* care for, among other things, that, during assembly of the individual components of the sensor unit 2 and during the filling with the filling, the piezoelectric elements 11*a*, 11*b* are pressed against the walls that they contact. In this way, the forced coupling between the piezoelectric elements 11*a*, 11*b* and the walls of the hollow spaces 10*a*, 10*b* of the oscillatory elements 9*a*, 9*b* is improved.

The coupling elements 12*a*, 12*b* serve for mechanical, and, in given cases, also acoustic decoupling of the piezoelectric elements 11*a*, 11*b*. Using coupling elements 12*a*, 12*b*, negative influences of the filling 13*a*, 13*b*, especially thermal expansion effects, can be eliminated, e.g. compensated. The filling 13*a*, 13*b* thus ages slower and this, in turn, leads to a frequency stability of the sensor unit constant with time, especially as regards the positions of characteristic frequencies, such as the eigenfrequencies. Frequency drift can, thus, be reduced, e.g. prevented. If the coupling element additionally enables an acoustic decoupling of the piezoelectric elements 11*a*, 11*b*, then, additionally, the travel time measurement can be improved by means of the transmitted signal T and second received signal $R_T$ over a broad temperature range.

The invention claimed is:

1. An apparatus for determining and/or monitoring at least one process variable of a medium, comprising:

a sensor unit including a mechanically oscillatable unit, wherein at least one hollow space forms an internal volume in the mechanically oscillatable unit, and wherein the hollow space is filled with a potting compound, a first piezoelectric element, wherein the first piezoelectric element is arranged at least partially in the hollow space of the oscillatable unit such that the first piezoelectric element lies against a wall of the hollow space, wherein the apparatus is embodied to excite the mechanically oscillatable unit using an excitation signal such that mechanical oscillations are executed, to receive the mechanical oscillations of the oscillatable unit, and to convert the mechanical oscillations into a first received signal, to transmit a transmitted signal to the medium and to receive a second received signal, wherein the transmitted signal is an ultrasonic signal, and to determine and/or to monitor the at least one process variable based on the first and/or second received signal;

wherein a coupling element is arranged in the internal volume of the mechanically oscillatable unit such that the coupling element is in mechanical contact with the first piezoelectric element, and the first piezoelectric element is arranged between the wall of the hollow space and the coupling element, wherein the coupling element includes securement means for securing the coupling element in the internal volume, wherein the securement means includes a spring element.

2. The apparatus as claimed in claim 1, wherein the sensor unit further includes a second piezoelectric element.

3. The apparatus as claimed in claim 2, wherein the mechanically oscillatable unit is an oscillatory fork having a first oscillatory element and a second oscillatory element, and wherein the first piezoelectric element is arranged at least partially in the first oscillatory element and the second piezoelectric element is arranged at least partially in the second oscillatory element.

4. The apparatus as claimed in claim 1, wherein the sensor unit further includes a unit for determining and/or monitoring temperature of the medium, a unit for determining and/or monitoring a pressure of the medium, and/or a unit for determining and/or monitoring a conductivity and/or permittivity of the medium.

5. The apparatus as claimed in claim 1, wherein the coupling element is composed at least partially of a compressible, porous material having a Poisson's ratio of <0.3.

6. The apparatus as claimed in claim 5, wherein the compressible material is a foam material based on polypropylene, silicone rubber, polymethylmethacrylate, polyurethane, or polyamide; a porous paper; or a foamed adhesive.

7. The apparatus as claimed in claim 6, wherein the coupling element is embodied in the form of a thin film or in the form of a coating.

8. The apparatus as claimed in claim 1, wherein the securement means includes a volumed body and/or a clamp body.

* * * * *